United States Patent
Hou (10) Patent No.: US 10,235,586 B2
(45) Date of Patent: Mar. 19, 2019

(54) IMAGE PROCESSING SYSTEM CAPABLE OF EXECUTING OPERATION BY RECOGNIZING INFORMATION ENCODING PATTERN AND IMAGE DISPLAYED ALTERNATELY AND RELATED METHOD

(71) Applicant: Wistron Corporation, New Taipei (TW)

(72) Inventor: Chia-Chang Hou, New Taipei (TW)

(73) Assignee: Wistron Corporation, New Taipei (TW)

( * ) Notice: Subject to any disclaimer, the term of this patent is extended or adjusted under 35 U.S.C. 154(b) by 354 days.

(21) Appl. No.: 14/451,384

(22) Filed: Aug. 4, 2014

(65) Prior Publication Data
US 2015/0278624 A1    Oct. 1, 2015

(30) Foreign Application Priority Data
Mar. 27, 2014   (TW) .............................. 103111557 A (51) Int. Cl.
*G06F 3/038* (2013.01)
*G06K 9/22* (2006.01)
(Continued)

(52) U.S. Cl.
CPC ............. *G06K 9/222* (2013.01); *G06F 3/038* (2013.01); *G06F 3/0321* (2013.01);
(Continued)

(58) Field of Classification Search
CPC .... G06F 3/0321; G06F 3/03545; G06F 3/038; G06F 2203/04101; G09G 3/2029;
(Continued)

(56) References Cited

U.S. PATENT DOCUMENTS

| 5,574,504 A | * | 11/1996 | Yagasaki | H04N 9/8047 |
| | | | | 375/240.13 |
| 6,760,478 B1 | * | 7/2004 | Adiletta | H04N 19/159 |
| | | | | 375/240.02 |

(Continued)

FOREIGN PATENT DOCUMENTS

| CN | 1637775 A | 7/2005 |
| GB | 2438524 A | 11/2007 |
| TW | 200743993 | 12/2007 |

OTHER PUBLICATIONS

Office action dated Jul. 20, 2015 for the Taiwan application No. 103111557, filing date: Mar. 27, 2014, p. 1 line 13-14, p. 2-3 and p. 4 line 1-14.

(Continued)

*Primary Examiner* — Jennifer Mehmood
*Assistant Examiner* — James S Nokham
(74) *Attorney, Agent, or Firm* — Winston Hsu (57) ABSTRACT

An image processing system includes a host device, an input device and an information processing module. The host device includes a storage module, a first data transmission interface, a display module and a control unit. The control unit controls the display module to separately display at least one information encoding pattern at different time points. The input device includes an image capturing module, a second data transmission interface and a processing unit. The image capturing module captures a part of the at least one information encoding pattern displayed on the display module. The processing unit controls the second data transmission interface to transmit data to the first data transmission interface. The information processing module recognizes the part of the at least one information encoding (Continued)

pattern captured by the image capturing module, so as to control the host device or the input device to execute corresponding operation.

16 Claims, 7 Drawing Sheets

(51) Int. Cl.
*G06F 3/03* (2006.01)
*G06F 3/0354* (2013.01)
*G06T 1/00* (2006.01)
*G06T 11/00* (2006.01)

(52) U.S. Cl.
CPC ........ *G06F 3/03545* (2013.01); *G06T 1/0007* (2013.01); *G06T 11/001* (2013.01); *G06F 2203/04101* (2013.01); *G06T 2200/28* (2013.01); *G06T 2207/30176* (2013.01)

(58) Field of Classification Search
CPC .... H04N 19/172; H04N 19/51; H04N 19/159; H04N 9/8047; G06K 9/00765; G06K 9/222; G06T 1/0007; G06T 11/001; G06T 2200/28; G06T 2207/30176
USPC ................ 345/173–174, 179, 589; 715/246; 726/16; 178/18.06
See application file for complete search history.

(56) References Cited

U.S. PATENT DOCUMENTS

| | | | | |
|---|---|---|---|---|
| 6,895,048 | B2* | 5/2005 | Boice | H04N 19/159 375/240 |
| 2005/0149865 | A1* | 7/2005 | Wang | G06F 3/0321 715/246 |
| 2005/0201621 | A1* | 9/2005 | Wang | G06F 3/0321 382/188 |
| 2006/0267957 | A1* | 11/2006 | Kolmykov-Zotov | G06F 3/0416 345/173 |
| 2008/0152014 | A1* | 6/2008 | Schreier | H04N 19/172 375/240.21 |
| 2009/0016623 | A1* | 1/2009 | Higewake | H04N 19/51 382/236 |
| 2011/0157475 | A1* | 6/2011 | Wright | G06K 9/00765 348/700 |
| 2011/0242060 | A1* | 10/2011 | McGibney | G06F 3/03545 345/179 |
| 2012/0006898 | A1* | 1/2012 | Rezende | G06F 3/0321 235/472.03 |
| 2012/0287144 | A1* | 11/2012 | Gandhi | G09G 3/2029 345/589 |
| 2012/0331546 | A1* | 12/2012 | Falkenburg | G06F 3/03545 726/16 |

OTHER PUBLICATIONS

Office action dated Jun. 27, 2017 for China application No. 201410147707.5, filing date date Apr. 14, 2014, p. 3-7.

* cited by examiner

IMAGE PROCESSING SYSTEM CAPABLE OF EXECUTING OPERATION BY RECOGNIZING INFORMATION ENCODING PATTERN AND IMAGE DISPLAYED ALTERNATELY AND RELATED METHOD

BACKGROUND OF THE INVENTION

1. Field of the Invention

The present invention relates to an image processing system and a related method, and more specifically, to an image processing system for generating information by image recognition and a related method.

2. Description of the Prior Art

Nowadays, touch electronic devices, such as a table computer and a touch panel apparatus, are in widespread use in daily life and replace a personal computer. The touch electronic device usually includes a touch display module and a stylus. As utilizing the stylus in touch control, it is more rapid and accurate to execute corresponding operation. However, a conventional display panel is not capable of touch control, and an additional touch panel has to be disposed on the conventional display panel, so as to perform the touch display module with touch control function. However, the structure of the conventional display panel has to be reconfigured as adding touch control function. The touch panel and the related components have to be installed on the conventional display panel, causing waste of time in assembly and high cost. Therefore, it is an important issue to design a display module capable of utilizing the stylus in touch operation without reconfiguring the display panel.

SUMMARY OF THE INVENTION

The present invention relates to an image processing system and a related method, and more specifically, to an image processing system for generating information by image recognition and a related method to solve the above mentioned drawbacks.

According to the disclosure, an image processing system for generating information by image recognition includes a host device, at least one input module and an information processing module. The host device includes a storage module, a first data transmission interface, a display module and a control unit. The storage module stores at least one information encoding pattern. The display module is for displaying images. The control unit is electrically connected to the storage module, the first data transmission interface and the display module, and the control unit is for controlling the display module to separately display at least one information encoding pattern and other images at different time points. The at least one input device includes an image capturing module for capturing a part of the at least one information encoding pattern displayed on the display module of the host device. The processing unit is electrically connected to the image capturing module and the second data transmission interface, and the processing unit is for controlling the second data transmission interface to transmit data to the first data transmission interface. The information processing module is for recognizing the part of the at least one information encoding pattern displayed by the display module and captured by the image capturing module, so as to control the host device or the at least one input device to execute corresponding operation.

According to the disclosure, the control unit is for controlling the display module to display the at least one information encoding pattern at a specific frequency.

According to the disclosure, the specific frequency is greater than 30 Hz.

According to the disclosure, the at least one input device is a stylus device, and the information processing module is for recognizing the part of the at least one information encoding pattern displayed by the display module and captured by the image capturing module, so as to calculate a corresponding coordinate value of the stylus device corresponding to a position of the part of the at least one information encoding pattern displayed by the display module.

According to the disclosure, the at least one information encoding pattern comprises a plurality of coordinate sections arranged in array alignment.

According to the disclosure, each of the plurality of coordinate sections is consisted of color blocks or dotted blocks.

According to the disclosure, a size of each of the plurality of coordinate sections is greater than a size of a single pixel.

According to the disclosure, the storage module stores a plurality of different information encoding patterns, the image processing system comprises a plurality of input devices, the control unit is for controlling the display module to separately display the plurality of different information encoding patterns at different time points, and the information processing module is for respectively recognizing parts of the plurality of different information encoding patterns captured by the image capturing modules of the plurality of input devices, so as to respectively calculate the corresponding coordinate values of the plurality of input devices corresponding to positions of the parts of the plurality of different information encoding patterns displayed by the display module.

According to the disclosure, the at least one information encoding pattern includes a recognition code information, the image capturing module is a camera module, and the information processing module is for recognizing the recognition code information so as to generate a message corresponding to the recognition code information.

According to the disclosure, the information processing module is installed in the host device, the processing unit is for controlling the second data transmission interface to transmit the part of the information encoding pattern displayed by the display module and captured by the image capturing module to the first data transmission interface, and the information processing module is for recognizing the part of the information encoding pattern received by the first data transmission interface, so as to control the host device or the at least one input device to execute the corresponding operation.

According to the disclosure, an image processing method is adapted for use in an image processing system. The image processing system includes a host device and at least one input device. The image processing method includes utilizing a storage module of the device to store at least one information encoding pattern, controlling a display module of the host device to separately display the at least one information encoding pattern and other images at different time points, utilizing an image capturing module of the at least one input device to capture apart of the information encoding pattern displayed by the display module, and recognizing the part of the at least one information encoding pattern displayed by the display module and captured by the image capturing module, so as to control the host device or the at least one input device to execute corresponding operation.

According to the disclosure, the image processing method includes controlling the display module to display the at least one information encoding pattern at a specific frequency.

According to the disclosure, the specific frequency is greater than 30 Hz.

According to the disclosure, the at least one input device is a stylus device. Recognizing the part of the at least one information encoding pattern displayed by the display module and captured by the image capturing module, so as to control the host device or the input device to execute the corresponding operation includes recognizing the part of the at least one information encoding pattern displayed by the display module and captured by the image capturing module, so as to calculate a corresponding coordinate value of the stylus device corresponding to a position of the part of the at least one information encoding pattern displayed by the display module.

According to the disclosure, the image processing method further includes utilizing the storage module of the host device to store a plurality of different information encoding patterns, controlling the display module of the host device to separately display the plurality of different information encoding patterns at different time points, utilizing the image capturing modules of the plurality of input devices to respectively capture parts of the plurality of different information encoding patterns, and respectively recognizing the parts of the plurality of different information encoding patterns captured by the image capturing modules, so as to respectively calculate the corresponding coordinate values of the plurality of input devices corresponding to positions of the parts of the plurality of different information encoding patterns displayed by the display module.

According to the disclosure, the at least one information encoding pattern includes a recognition code information. Recognizing the part of the at least one information encoding pattern captured by the image capturing module, so as to control the host device or the input device to execute the corresponding operation includes recognizing the recognition code information so as to generate a message corresponding to the recognition code information.

According to the disclosure, the image processing method further includes transmitting the part of the information encoding pattern displayed by the display module and captured by the image capturing module of the input device to the host device, and recognizing the part of the information encoding pattern received by the host device, so as to control the host device or the at least one input device to execute the corresponding operation.

The image processing system of the present invention controls the display module to separately display the information encoding pattern and other images at different time points, and provides the image capturing module to capture the part of the information encoding pattern displayed by the display module. The information processing module can recognize the part of the information encoding pattern displayed by the display module and captured by the image capturing module, so as to control the host device or the input device to execute the corresponding operation. Accordingly, the image processing system of the present invention can generate the corresponding information and execute the corresponding operation by the image recognition without installing any touch panel on the display module. Hence, the conventional issue of waste of time in assembly and high cost caused by reconfiguring the structure of the display module as adding touch control function into the display module can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
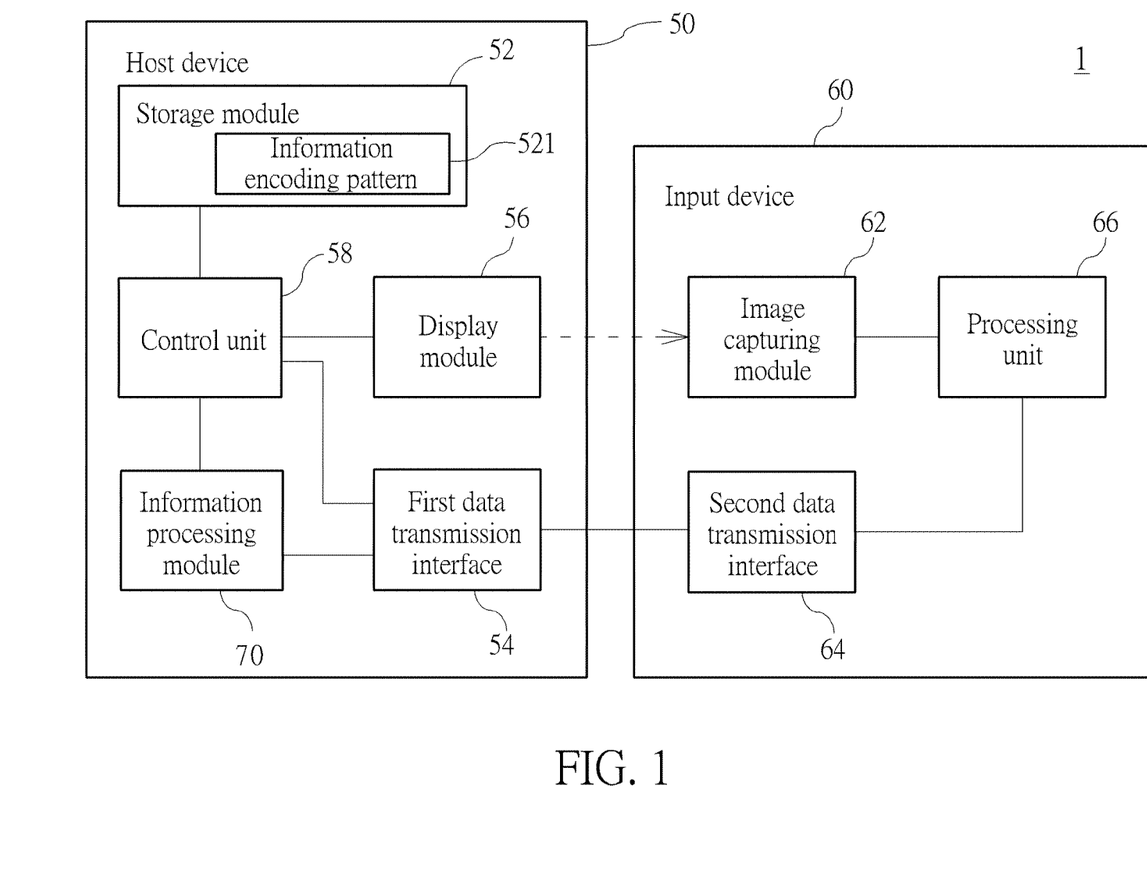
FIG. 1 is a functional block diagram of an image processing system according to a first embodiment of the present invention.

Please refer to FIG. 1. FIG. 1 is a functional block diagram of an image processing system 1 according to a first embodiment of the present invention. The image processing system 1 includes a host device 50, at least one input device 60 and an information processing module 70. The host device 50 includes a storage module 52, a first data transmission interface 54, a display module 56 and a control unit 58. The storage module 52 stores at least one information encoding pattern 521, and the display module 56 is for displaying images. The control unit 58 is electrically connected to the storage module 52, the first data transmission interface 54 and the display module 56. The control unit 58 is for controlling the display module 56 to separately display the at least one information encoding pattern 521 and other images, such as operating system images, at different time points. The input device 60 includes an image capturing module 62, a second data transmission interface 64, and a processing unit 66. The image capturing module 62 is for capturing a part of the at least one information encoding pattern 521 displayed on the display module 56 of the host device 50. The processing unit 66 is electrically connected to the image capturing module 62 and the second data transmission interface 64, and the processing unit 66 is for controlling the second data transmission interface 64 to transmit data to the first data transmission interface 54. The information processing module 70 is for recognizing the part of the at least one information encoding pattern 521 displayed by the display module 56 and captured by the image capturing module 62, so as to control the host device 50 or the at least one input device 60 to execute corresponding operation. In this embodiment, the information processing module 70 can be preferably installed in the host device for efficiently receiving information and recognizing the information encoding pattern 521, so as to control the host device to execute the corresponding operation. According to other embodiment, the data processing module 70 can be installed in the input device 60.

Figure 2:
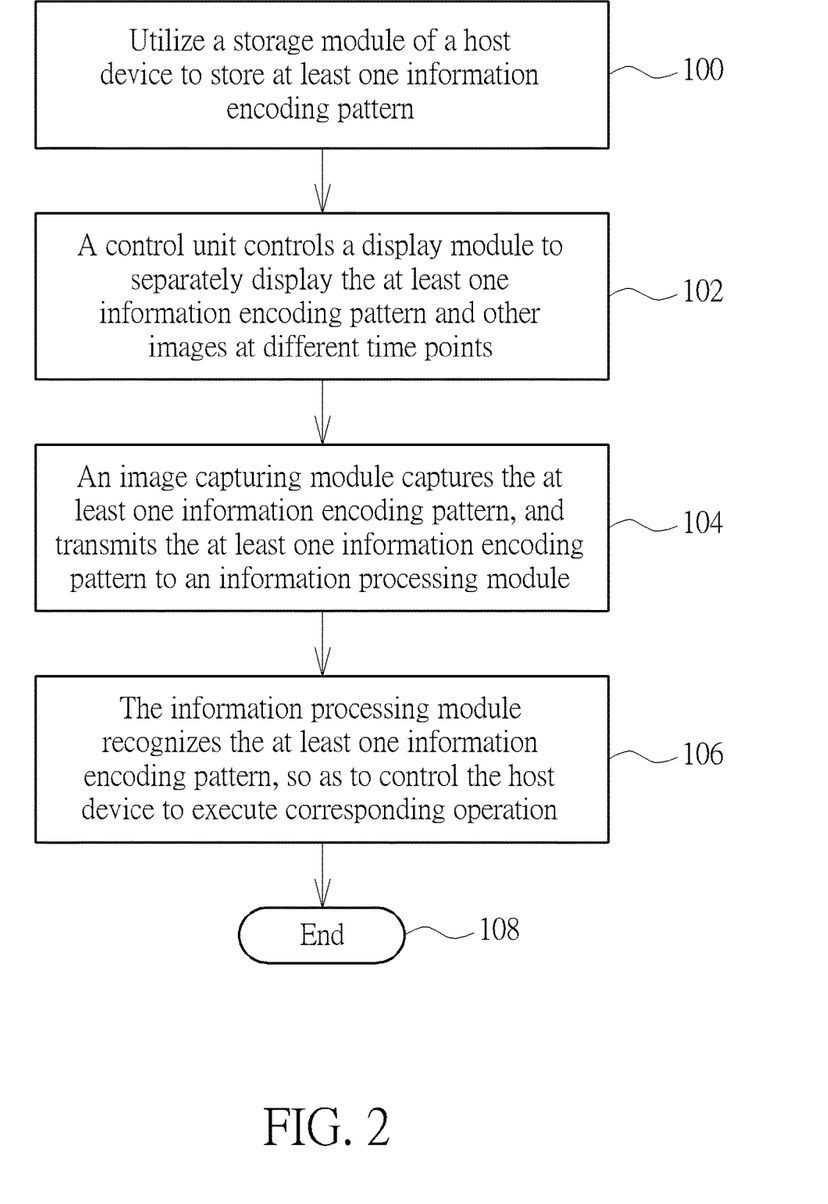
FIG. 2 is a flowchart of the image processing system utilizing image recognition to generate corresponding information according to the first embodiment of the present invention.

Please refer to FIG. 2. FIG. 2 is a flowchart of the image processing system 1 utilizing image recognition to generate corresponding information according to the first embodiment of the present invention. The method includes following steps:

Step 100: Utilize the storage module 52 of the host device 50 to store the at least one information encoding pattern 521.

Step 102: The control unit 58 controls the display module 56 to separately display the at least one information encoding pattern 521 and other images at different time points.

Step 104: The image capturing module 62 captures the part of the at least one information encoding pattern 521 displayed by the display module 56 at different time points and then transmits the part of the at least one information encoding pattern 521 to the information processing module 70.

Step 106: The information processing module 70 recognizes the part of the at least one information encoding pattern 521 displayed by the display module 56 and captured by the image capturing module 62, so as to control the host device 50 to execute the corresponding operation.

Step 108: End.

Figure 3:
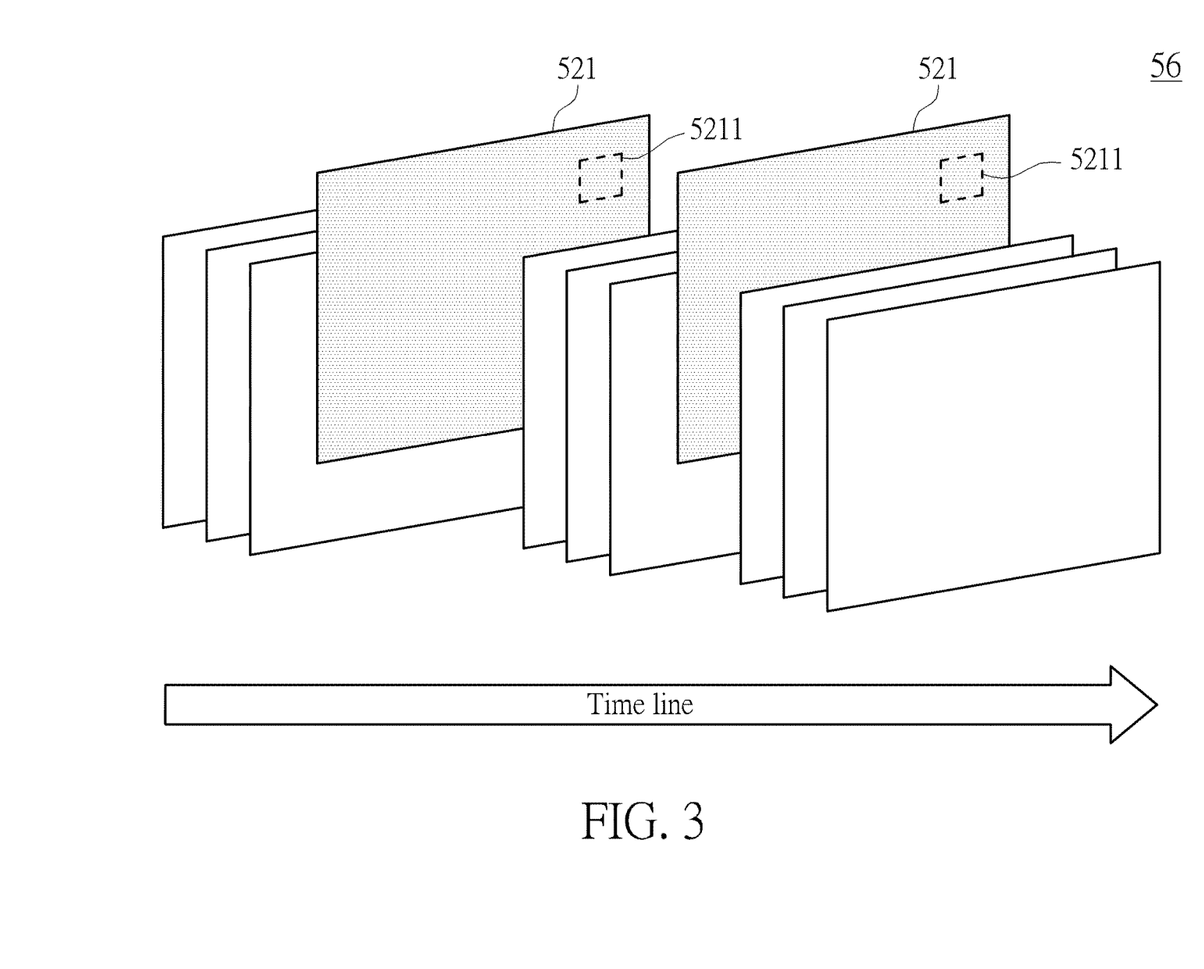
FIG. 3 is a diagram of a display module displaying images at different time points according to the first embodiment of the present invention.
Figure 4:
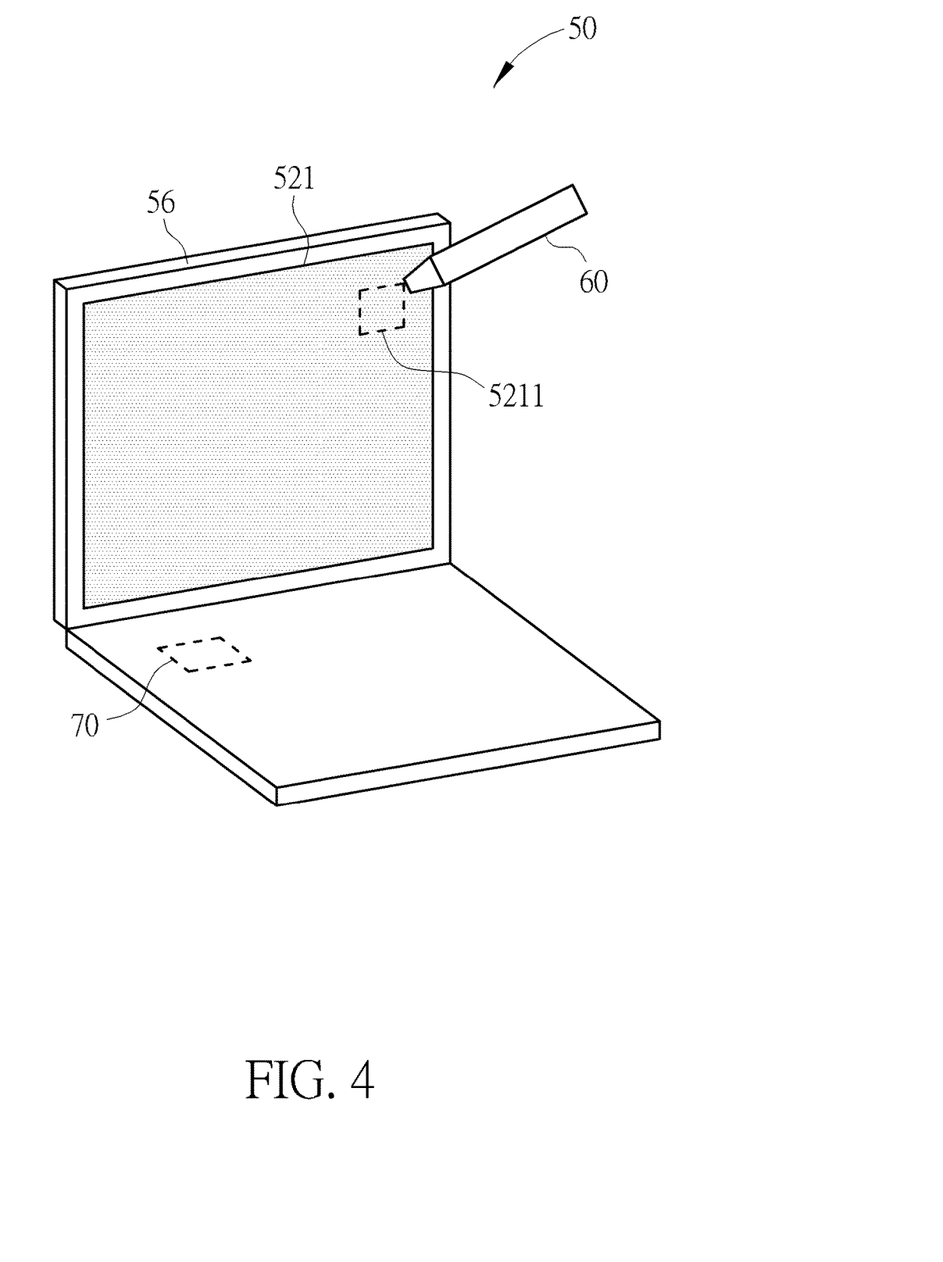
FIG. 4 is a diagram of an input device capturing a part of an information encoding pattern displayed on the display module according to the first embodiment of the present invention.

Detailed introduction of the above steps is described as follows. Please refer to FIG. 1 to FIG. 4. FIG. 3 is a diagram of the display module 56 displaying images at different time points according to the first embodiment of the present invention. FIG. 4 is a diagram of the input device 60 capturing the part of the information encoding pattern 521 displayed on the display module 56 according to the first embodiment of the present invention. In step 100, the storage module 52 of the host device 50 stores the at least one information encoding pattern 521. The information encoding pattern 521 can include a plurality of coordinate sections 5211 arranged in array alignment, each of the plurality of coordinate sections 5211 can be consisted of color blocks or dotted blocks, and a size of each of the plurality of coordinate sections 5211 can be greater than a size of a single pixel. For example, each of the plurality of coordinate sections 5211 can be equal, and the size of each of the plurality of coordinate sections 5211 is preferably to be 20×20 or 30×30 pixels. Furthermore, in this embodiment, the host device 50 can be a computer device, and the input device 60 can be a stylus device.

In step 102, as shown in FIG. 3, the control unit 58 controls the display module 56 to separately display the at least one information encoding pattern 521 and other images at different time points. For example, the control unit 58 controls the display module 56 to display the at least one information encoding pattern 521 at a specific frequency, and the specific frequency can be greater than 30 Hz. For example, the control unit 58 controls the display module 56 to insert one information encoding pattern 521 at a frequency of 60 Hz, that is at an imaging frame rate of 60 FPS (frame per second), which is greater than a frequency of persistence of vision of human eyes, so as to prevent users from recognizing the information encoding pattern 521 of the display module. The users would not be aware of the exist of the information encoding pattern 521 as watching the display module 56, so as to prevent the displaying image from the interference due to the information encoding pattern 521. In other embodiments, the frequency of the information encoding pattern 521 can be 30 Hz or 120 Hz.

In step 104, as shown in FIG. 4, the input device 60 can move freely on the display module 56, and the image capturing module 62 of the input device 60 can capture the coordinate section 5211 of the information encoding pattern 521, that is, the part of the at least one information encoding pattern 521 displayed by the display module 56. In addition, for speeding up the process, images captured by the image capturing module 62 can include other images at a position corresponding to the coordinate section 5211 displayed by the display module 56 at different time points, such as images of an operating system. That is, the image capturing module 62 captures the part of the information encoding pattern 521 and a part of normal display images, and the image capturing module 62 transmits all image data to the processing unit 66. And then, the processing unit 66 can process the image data including the coordinate section 5211 and other images. For example, the processing unit 66 can process lossless compression to the image data so as to reduce memory capacity occupied by the image data. The processing unit 66 can control the second data transmission interface 64 to transmit the image data to the first data transmission interface 54 of the host device 50. The data can be transmitted between the first data transmission interface 54 and the second data transmission interface 64 with wire or wirelessly, and it depends on practical requirements.

In step 106, the information processing module 70 installed in the host device 50 receives the image data and then compares the image data with the information encoding pattern 521. If the coordinate section 5211 captured by the image capturing module 62 corresponds to the information encoding pattern 521 stored in the storage module 52, a coordinate value corresponding to the coordinate section 5211 can be calculated. The coordinate value is corresponding to the position of the input device 60 located on the information encoding pattern 521 displayed by the display module 56, that is, a touch position of the input device 60 while executing touch operation. And then, the information processing module 70 transmits the coordinate value to the control unit 58, so as to control the host device 50 to execute the corresponding operation.

In the aforesaid embodiment, the control unit 58 controls the display module 56 to display one kind of the information encoding pattern 521 at the specific frequency, and the present invention is not limited to this. In other embodiment, the control unit 58 can control the display module 56 to display different information encoding patterns 521 at a specific frequency. The storage module 52 can store a plurality of different information encoding patterns 521, the image processing system 1 can include a plurality of input devices 60, and the control unit 58 controls the display module 56 to separately display the plurality of different information encoding patterns 521 at different time points. For example, the display module 56 alternately displays the plurality of different information encoding patterns 521 at the specific frequency, and the plurality of input devices 60 are respectively corresponding to the plurality of different information encoding patterns 521. The information processing module 70 respectively recognize the part of the plurality of different information encoding patterns 521 captured by the image capturing modules 62 of the plurality of input devices 60, so as to calculate corresponding coordinate values of the plurality of input devices 60 corresponding to positions of the parts of the plurality of different information encoding patterns 521 displayed by the display module 56. Hence, the recognition of different stylus devices can be achieved. For example, the plurality of different input devices 60 can be styluses with different color and can be applied in education. A student can answer with a blue stylus, and a teacher can review with a red stylus simultaneously, so that application of touch control technology can be enhanced.

Figure 5:
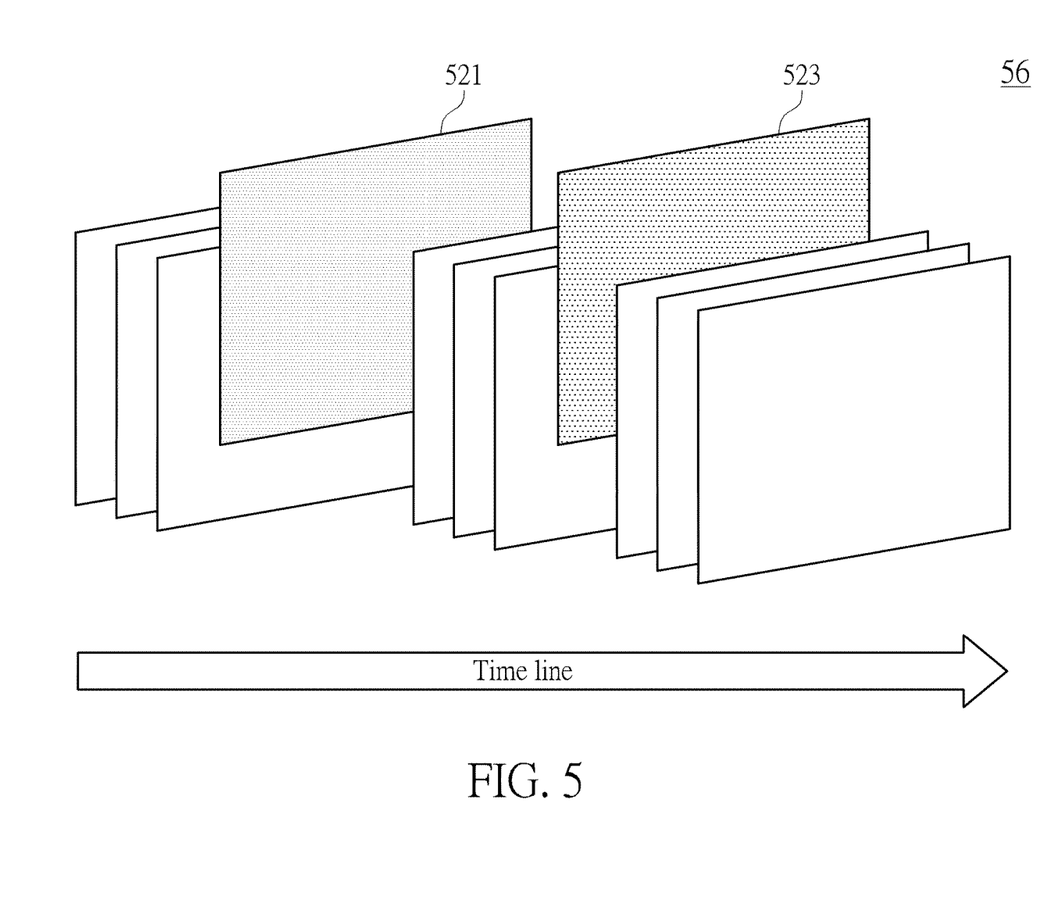
FIG. 5 is a diagram of a display module displaying images at different time points according to a second embodiment of the present invention.
Figure 6:
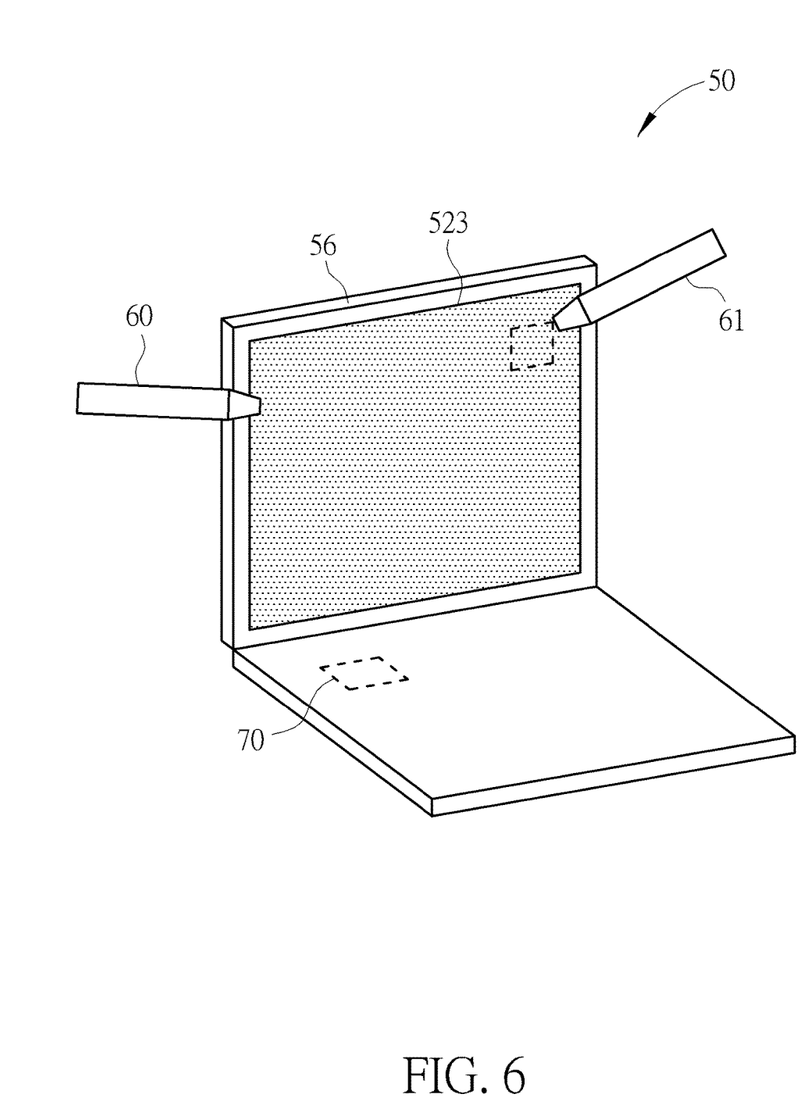
FIG. 6 is a diagram of two input devices capturing parts of an information encoding pattern displayed on the display module according to the second embodiment of the present invention.

Please refer to FIG. 5 and FIG. 6. FIG. 5 is a diagram of the display module 56 displaying images at different time points according to a second embodiment of the present invention. FIG. 6 is a diagram of two input devices 60, 61 capturing parts of an information encoding pattern 523 displayed on the display module 56 according to the second embodiment of the present invention. As above mentioned, the control unit 58 controls the display module 56 to separately display the two different information encoding patterns 521, 523 at different time points in this embodiment. For example, the dispositions of the color of the two information encoding patterns 521, 523 can be different, so that the information processing module 70 can easily recognize the two information encoding patterns 521, 523. The two information encoding patterns 521, 523 can be displayed by the display module 56 at the same frequency. For example, the two information encoding patterns 521, 523 can be displayed by the display module 56 at 30 Hz. The image processing system 1 includes the two input devices 60, 61 corresponding to the two information encoding patterns 521, 523. The input devices 60, 61 can be used to capture parts of the information encoding patterns 521, 523 and other images during a time period. Image data transmitted from the input device 60 to the information processing module 70 can include the parts of the information encoding patterns 521, 523 and other images, and the information processing module 70 can just process the part of the information encoding patterns 521 captured by the input device 60 and ignore the part of the information encoding patterns 523 and other images for speeding up the process. And then, the information processing module 70 can calculate the corresponding coordinate value of the input device 60 corresponding to the position of the part of the information encoding pattern 521 displayed by the display module 56, so as to control the host device 50 to execute the corresponding operation. On the other hand, image data transmitted from the input device 61 to the information processing module 70 can include the parts of the information encoding patterns 521, 523 and other images, and the information processing module 70 can just process the part of the information encoding patterns 523 captured by the input device 61 and ignore the part of the information encoding patterns 521 and other images for speeding up the process. And then, the information processing module 70 can calculate the corresponding coordinate value of the input device 61 corresponding to the position of the part of the information encoding pattern 523 displayed by the display module 56, so as to control the host device 50 to execute the corresponding operation. As a result, the input devices 60, 61 can move to the same position or different positions on a screen of the display module 56 and capture the parts of the information encoding patterns 521, 523 in the same position or in different positions, so that the host device 50 can respectively execute different operation according to the image data transmitted from the different input devices 60, 61.

Figure 7:
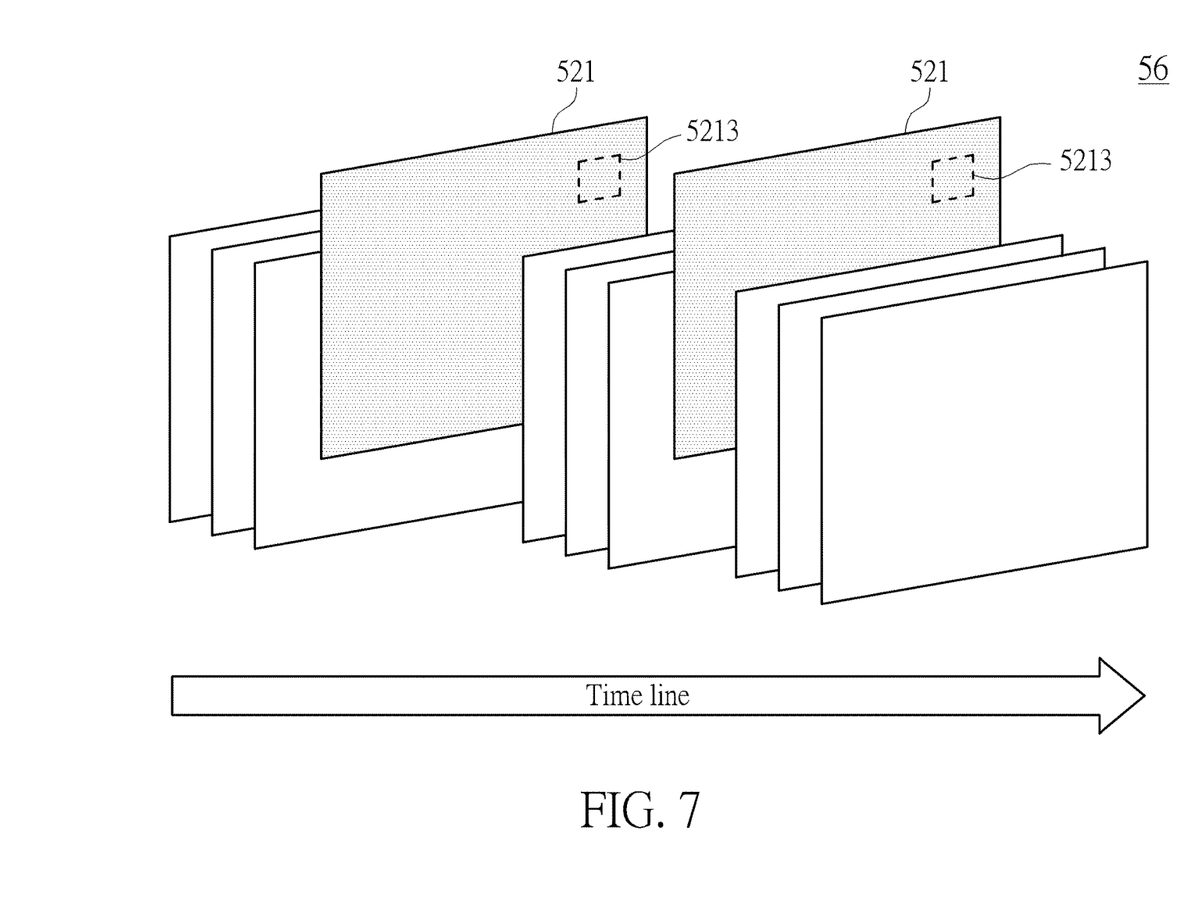
FIG. 7 is a diagram of a display module displaying images at different time points according to a third embodiment of the present invention.

Please refer to FIG. 1 and FIG. 7. FIG. 7 is a diagram of the display module 56 displaying images at different time points according to a third embodiment of the present invention. In this embodiment, the information encoding pattern 521 includes a recognition code information 5213, the image capturing module 62 is a camera module, and the camera module can have a prime lens or a zoom lens. As the aforesaid embodiment, the control unit 58 controls the display module 56 separately to display the information encoding pattern 521 and other images at different time points, and the image capturing module 62 captures the recognition code information 5213 of the information encoding pattern 521 during a time period and transmits the recognition code information 5213 within the time period to the information processing module 70. The information processing module 70 recognizes the received recognition code information 5213, so as to generate a message corresponding to the recognition code information 5213 and to control the host device 50 or the input device 60 to execute the corresponding operation. For example, the input device 60 can be a mobile phone device, and the information processing module 70 can installed in the mobile phone device or in the host device 50, and the host device 50 can be an electronic billboard for continuously displaying advertisement. The information encoding pattern 521 can be inserted into the advertising display frames at a specific frequency. The information processing module 70 can recognize the recognition code information 5213 to be an advertising website link according to the recognition code information 5213 displayed by the display module 56 and captured by the image capturing module 62, so as to control the host device 50 or the input device 60 to link and enter the website corresponding to the advertising website link, and an interactive advertisement is performed.

In contrast to prior art, the image processing system of the present invention controls the display module to separately display the information encoding pattern and other images at different time points, and provides the image capturing module to capture the part of the information encoding pattern displayed by the display module. The information processing module can recognize the part of the information encoding pattern displayed by the display module and captured by the image capturing module, so as to control the host device or the input device to execute the corresponding operation. Accordingly, the image processing system of the present invention can generate the corresponding information and execute the corresponding operation by the image recognition without installing any touch panel on the display module. Hence, the conventional issue of waste of time in assembly and high cost caused by reconfiguring the structure of the display module as adding touch control function into the display module can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system comprising:
   a host device comprising:
      a storage module for storing at least one information encoding pattern;
      a first data transmission interface;
      a display module for displaying images; and
      a control unit electrically connected to the storage module, the first data transmission interface and the display module, and the control unit for controlling the display module to separately display the at least one information encoding pattern without displaying another image at a T1 time point and then further display the another image without displaying the at least one information encoding pattern and another information encoding pattern different from the at least one information encoding pattern at another time point different from the T1 time point, wherein the at least one information encoding pattern is not generated by the another image, and the control unit controls the display module to display the at least one information encoding pattern at a specific frequency greater than 30 Hz;

at least one input device comprising:
- an image capturing module for capturing a part of the at least one information encoding pattern displayed on the display module of the host device;
- a second data transmission interface; and
- a processing unit electrically connected to the image capturing module and the second data transmission interface, and the processing unit for controlling the second data transmission interface to transmit data to the first data transmission interface; and
- an information processing module for recognizing the part of the at least one information encoding pattern displayed by the display module at the T1 time point and captured by the image capturing module and not recognizing the another image and the another information encoding pattern different from the at least one information encoding pattern at the another time point different from the T1 time point, so as to control the host device or the at least one input device to execute corresponding recognition operation.

2. The image processing system of claim 1, wherein the at least one input device is a stylus device, and the information processing module is for recognizing the part of the at least one information encoding pattern displayed by the display module and captured by the image capturing module, so as to calculate a corresponding coordinate value of the stylus device corresponding to a position of the part of the at least one information encoding pattern displayed by the display module.

3. The image processing system of claim 2, wherein the at least one information encoding pattern comprises a plurality of coordinate sections arranged in array alignment.

4. The image processing system of claim 3, wherein each of the plurality of coordinate sections is consisted of color blocks or dotted blocks.

5. The image processing system of claim 3, wherein a size of each of the plurality of coordinate sections is greater than a size of a single pixel.

6. The image processing system of claim 2, wherein the storage module stores a plurality of different information encoding patterns, the image processing system comprises a plurality of input devices, the control unit is for controlling the display module to separately display the plurality of different information encoding patterns at different time points, and the information processing module is for respectively recognizing parts of the plurality of different information encoding patterns captured by the image capturing modules of the plurality of input devices, so as to respectively calculate the corresponding coordinate values of the plurality of input devices corresponding to positions of the parts of the plurality of different information encoding patterns displayed by the display module.

7. The image processing system of claim 1, wherein the at least one information encoding pattern comprises a recognition code information, the image capturing module is a camera module, and the information processing module is for recognizing the recognition code information so as to generate a message corresponding to the recognition code information.

8. The image processing system of claim 1, wherein the information processing module is installed in the host device, the processing unit is for controlling the second data transmission interface to transmit the part of the information encoding pattern displayed by the display module and captured by the image capturing module to the first data transmission interface, and the information processing module is for recognizing the part of the information encoding pattern received by the first data transmission interface, so as to control the host device or the at least one input device to execute the corresponding recognition operation.

9. An image processing method adapted for use in an image processing system, the image processing system comprising a host device and at least one input device, and the image processing method comprising:
- utilizing a storage module of the device to store at least one information encoding pattern;
- controlling a display module of the host device to separately display the at least one information encoding pattern without displaying another image at a T1 time point and then further display the another image without displaying the at least one information encoding pattern and another information encoding pattern different from the at least one information encoding pattern at another time point different from the T1 time point, wherein the at least one information encoding pattern is not generated by the another image, and the control unit controls the display module to display the at least one information encoding pattern at a specific frequency greater than 30 Hz;
- utilizing an image capturing module of the at least one input device to capture a part of the information encoding pattern displayed by the display module; and
- recognizing the part of the at least one information encoding pattern displayed by the display module at the T1 time point and captured by the image capturing module and not recognizing the another image and the another information encoding pattern different from the at least one information encoding pattern at the another time point different from the T1 time point, so as to control the host device or the at least one input device to execute corresponding recognition operation.

10. The image processing method of claim 9, wherein the at least one input device is a stylus device, and recognizing the part of the at least one information encoding pattern displayed by the display module and captured by the image capturing module, so as to control the host device or the input device to execute the corresponding recognition operation comprises:
- recognizing the part of the at least one information encoding pattern displayed by the display module and captured by the image capturing module, so as to calculate a corresponding coordinate value of the stylus device corresponding to a position of the part of the at least one information encoding pattern displayed by the display module.

11. The image processing method of claim 10, wherein the at least one information encoding pattern comprises a plurality of coordinate sections arranged in array alignment.

12. The image processing method of claim 11, wherein each of the plurality of coordinate sections is consisted of color blocks or dotted blocks.

13. The image processing method of claim 11, wherein a size of each of the plurality of coordinate sections is greater than a size of a single pixel.

14. The image processing method of claim 10, further comprising:

utilizing the storage module of the host device to store a plurality of different information encoding patterns;

controlling the display module of the host device to separately display the plurality of different information encoding patterns at different time points;

utilizing the image capturing modules of the plurality of input devices to respectively capture parts of the plurality of different information encoding patterns; and respectively recognizing the parts of the plurality of different information encoding patterns captured by the image capturing modules, so as to respectively calculate the corresponding coordinate values of the plurality of input devices corresponding to positions of the parts of the plurality of different information encoding patterns displayed by the display module.

15. The image processing method of claim 9, wherein the at least one information encoding pattern comprises a recognition code information, and recognizing the part of the at least one information encoding pattern captured by the image capturing module, so as to control the host device or the input device to execute the corresponding recognition operation comprises recognizing the recognition code information so as to generate a message corresponding to the recognition code information.

16. The image processing method of claim 9, further comprising transmitting the part of the information encoding pattern displayed by the display module and captured by the image capturing module of the input device to the host device, and recognizing the part of the information encoding pattern received by the host device, so as to control the host device or the at least one input device to execute the corresponding recognition operation.

* * * * *